US010411811B2

(12) United States Patent
Willner et al.

(10) Patent No.: US 10,411,811 B2
(45) Date of Patent: *Sep. 10, 2019

(54) SYSTEMS AND TECHNIQUES FOR COMMUNICATION USING COMBINED ORBITAL ANGULAR MOMENTUM AND MULTIPLE-INPUT-MULTIPLE-OUTPUT PROCESSING

(71) Applicant: University of Southern California, Los Angeles, CA (US)

(72) Inventors: Alan E. Willner, Los Angeles, CA (US); Yongxiong Ren, Los Angeles, CA (US); Long Li, Los Angeles, CA (US); Guodong Xie, Los Angeles, CA (US); Yinwen Cao, Los Angeles, CA (US); Zhe Wang, Los Angeles, CA (US); Cong Liu, Los Angeles, CA (US); Asher J. Willner, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/372,256

(22) Filed: Dec. 7, 2016

(65) Prior Publication Data
US 2018/0034556 A1    Feb. 1, 2018

Related U.S. Application Data

(60) Provisional application No. 62/264,030, filed on Dec. 7, 2015.

(51) Int. Cl.
*H04B 10/70* (2013.01)
*H04B 10/11* (2013.01)
(Continued)

(52) U.S. Cl.
CPC ........... *H04B 10/70* (2013.01); *H04B 7/0413* (2013.01); *H04B 10/11* (2013.01); *H04B 10/1121* (2013.01); *H04J 14/00* (2013.01)

(58) Field of Classification Search
CPC .... H04B 10/70; H04B 10/11; H04B 10/1121; G03H 1/2645; H04J 11/00
See application file for complete search history.

(56) References Cited

U.S. PATENT DOCUMENTS

2010/0278033 A1* 11/2010 Ilani ....................... H04L 5/0046
370/201
2012/0301157 A1* 11/2012 Qian ................. H04B 10/25133
398/192

(Continued)

OTHER PUBLICATIONS

Huang et al, "Crosstalk mitigation in a free-space orbital angular momentum multiplexed communication link using 4x33 4 MIMO equalization", Optics Letters, Optical Society of America, 2014.*
(Continued)

*Primary Examiner* — Omer S Mian
(74) *Attorney, Agent, or Firm* — Snell & Wilmer LLP

(57) ABSTRACT

A system includes a transmitter with multiple transmit devices each having an OAM multiplexer that converts multiple input signals into an OAM beam. Each transmit device outputs a coaxial group of orthogonal OAM beams. The system also includes a receiver that has multiple receive devices each having an OAM demultiplexer that receives the group of OAM beams from a corresponding transmit device. The OAM demultiplexer also converts the coaxial group of mutually orthogonal OAM beams into a plurality of received signals corresponding to input signals represented by the OAM beams. The receiver also includes a MIMO processor that has an equalizer that determines a transfer function corresponding to crosstalk of each of the plurality of received signals. The MIMO processor also reduces the (Continued)

crosstalk of each of the plurality of received signals based on the transfer function and updates the transfer function.

20 Claims, 11 Drawing Sheets

(51) Int. Cl.
    *H04B 7/0413*     (2017.01)
    *H04B 10/112*     (2013.01)
    *H04J 14/00*     (2006.01)

(56) References Cited

U.S. PATENT DOCUMENTS

2014/0314410 A1* 10/2014 Mumtaz ............. H04B 10/2581 398/65
2016/0041523 A1* 2/2016 Ashrafi ................ G03H 1/2645 359/9

OTHER PUBLICATIONS

X. Zhu et al.; "*Free-Space Optical Communication Through Atmospheric Turbulence Channels*"; IEEE Transactions on Communications, vol. 50, No. 8, Aug. 2002; 8 pages.

J. Anguita et al.: "*Shannon Capacities and Error-Correction Codes for Optical Atmospheric Turbulent Channels*"; Journal of Optical Networking, vol. 4, No. 9, Sep. 2005, pp. 586-601 16 pages.

J. H. Shapiro et al; "*Ultimate Channel Capacity of Free-Space Optical Communications*"; Journal of Optical Networking, vol. 4, 2005; 16 pages.

G. Gibson et al.; "*Free-Space Information Transfer Using Light Beams Carrying Orbital Angular Momentum*"; Optics Express, vol. 12, No. 22, Nov. 2004; 9 pages.

J. Wang et al.; "*Terabit Free-Space Data Transmission Employing Orbital Angular Momentum Multiplexing*"; Nature Photonics, vol. 6, pp. 488-496, Jul. 2012; 9 pages.

T. Su et al.; "*Demonstration of Free Space Coherent Optical Communication Using Integrated Silicon Photonic Orbital Angular Momentum Devices*"; Optics Express, vol. 20, No. 9, Apr. 2012; 7 pages.

L. Allen et al.; "*Orbital Angular Momentum of Light and the Transformation of Laguerre-Gaussian Laser Modes*"; Physical Review A, vol. 45, No. 11, Jun. 1992; 5 pages.

N. Bozinovic et al.; "*Terabit-Scale Orbital Angular Momentum Mode Division Multiplexing in Fibers*"; Science Magazine, vol. 340, Jun. 2013; 4 pages.

S. M. Navidpour et al.; "*BER Performance of Free-Space Optical Transmission with Spatial Diversity*"; IEEE Transaction on Wireless Communications, vol. 6, No. 8, Aug. 2007; 7 pages.

S. G. Wilson et al.; "*Free-Space Optical MIMO Transmission With Q-ary PPM*"; IEEE Transactions on Communications, vol. 53, No. 8, Aug. 2005; 11 pages.

Y. Ren et al.; "*Experimental Demonstration of 16 Gbit/s Millimeter-Wave Communications Using MIMO Processing of 2 OAM Modes on Each of Two Transmitter/Receiver Antenna Apertures*"; IEEE Global Telecommunications Conference, 2014; 6 pages.

G. Xie et al.; "*Performance Metrics and Design Considerations for a Free-Space Optical Orbital-Angular-Momentum-Multiplexed Communication Link*"; Optica; vol. 2, No. 4; Apr. 2015; 9 pages.

P. Winzer et al.; "*MIMO Capacities and Outage Probabilities in Spatially Multiplexed Optical Transport Systems*"; Optics Express, vol. 19, No. 17; Aug. 2011; 17 pages.

S. Randel et al.; "*6×56-Gb/s Mode-Division Multiplexed Transmission Over 33-km Few Mode Fiber Enabled by 6×6 MIMO Equalization*"; Optics Express, vol. 19, No. 17; Aug. 2011; 11 pages.

Y. Ren et al.; "*Atmospheric Turbulence Effects on the Performance of a Free Space Optical Link Employing Orbital Angular Momentum Multiplexing*"; Optics Letters, vol. 38, No. 20; Oct. 2013; 4 pages.

M. Krenn et al.; "*Communication with Spatially Modulated Light Through Turbulent Air Across Vienna*"; New Journal of Physics, 16; Sep. 2014; 10 pages.

Y. Ren et al.; "*Adaptive-Optics-Based Simultaneous Pre-and Post-Turbulence Compensation of Multiple Orbital-Angular-Momentum Beams in a Bidirectional Free-Space Optical Link*"; Optica, vol. 1, No. 6: Dec. 2014; 7 pages.

B. Rodenburg et al.; "*Simulating Thick Atmospheric Turbulence in the Lab with Application to Orbital Angular Momentum Communication*"; New Journal of Physics, 16; Jan. 2014; 13 pages.

F. Tamburini et al.; "*Encoding Many Channels on the Same Frequency Through Radio Vorticity: First Experimental Test*"; New Journal of Physics, vol. 14; Mar. 2012; 17 pages.

B. Thide et al.; "*Utilization of Photon Orbital Angular Momentum in the Low-Frequency Radio Domain*"; Physical Review Letters, vol. 99, Aug. 2007; 4 pages.

M. Tamagnone et al.; "*Comment on 'Encoding Many Channels on the Same Frequency Through Radio Vorticity: First Experimental Test'*"; New Journal of Physics, vol. 14; Nov. 2012; 7 pages.

F. Tamburini, et al.; "*Experimental Verification of Photon Angular Momentum and Vorticity with Radio Techniques*"; Applied Physics Letters, vol. 99, 2011; 3 pages.

N. Bozinovic et al.; "*Terabit-Scale Orbital Angular Momentum Mode Division Multiplexing in Fibers*"; Science Magazine, vol. 340, pp. 1545-1548, Jun. 2013; 4 pages.

Y. Yan et al.; "*High-Capacity Millimeter-Wave Communications with Orbital Angular Momentum Multiplexing*"; Nature Communications, Aug. 2014; 9 pages.

S. M. Mohammadi et al.; "*Orbital Angular Momentum in Radio—A System Study*"; IEEE Transactions on Antennas and Propagation, vol. 58, No. 2, 2010; 7 pages.

C. Sheldon et al.; "*Four-Channel Spatial Multiplexing Over a Millimeter-Wave Line-of-Sight Link*"; Microwave Symposium Digest, 2009, MTT '09, IEEE MTT-S International; 4 pages.

P. Driessen et al.; "*On the Capacity Formula for Multiple Input-Multiple Output Wireless Channels: A Geometric Interpretation*"; IEEE Transaction on Communications, vol. 47, No. 2, Feb. 1999; 4 pages.

A. J. Paulraj et al.; "*An Overview of MIMO Communications—A Key to Gigabit Wireless*"; Proceedings of the IEEE, vol. 92, No. 2, pp. 198-218, Feb. 2004; 21 pages.

G. A. Turnbull et al. ; "*The Generation of Free-Space Laguerre-Gaussian Modes at Millimeter-Wave Frequencies by Use of a Spiral Phaseplate*"; Optics Communications, vol. 127, pp. 183-188, Jun. 1996; 6 pages.

O.Edfors et al.; "*Is Orbital Angular Momentum (OAM) Based Radio Communication an Unexploited Area?*"; IEEE Transactions on Antennas and Propagation, vol. 60, pp. 1126-1131, 2012; 6 pages.

J.H. Winters; "*On the Capacity of Radio Communication Systems With Diversity in a Rayleigh Fading Environment*"; IEEE Journal on Selected Areas in Communications, vol. SAC-5, No. 5, pp. 871-878, Jun. 1987; 8 pages.

Vincent W. S. Chan; "*Free-Space Optical Communications*"; Journal of Lightwave Technology, vol. 24, No. 12, Dec. 2006; 13 pages.

E. Ciaramella et al.; "*1.28-Tb/s (32×40 Gb/s) Free-Space Optical WDM Transmission System*"; IEEE Photonics Technology Letters, vol. 21, No. 16, Aug. 2009; 3 pages.

A. Turpin et al.; "*Free-Space Optical Polarization Demultiplexing and Multiplexing by Means of Conical Refraction*"; Optics Letter, vol. 37, No. 20, Oct. 2012; 3 pages.

A.E. Willner et al.; "*Optical Communications Using Orbital Angular Momentum Beams*"; Advances in Optics and Photonics 7, pp. 66-106, 2015; 42 pages.

Jack H. Winters; "*On the Capacity of Radio Communication Systems with Diversity in a Rayleigh Fading Environment*"; IEEE Journal on Selected Areas in Communications, vol. SAC-5, No. 5, Jun. 1987,8 pages.

H. Huang et al; "*Crosstalk Mitigations in a Free-Space Orbital Angular Momentum Multiplexed Communication Link Using 4×4 MIMO Equalization*"; Optics Letters, vol. 39, No. 15, Aug. 2014; 4 pages.

(56) References Cited

OTHER PUBLICATIONS

M. Ready et al; *Blind Equalization Based on Radius Directed Adaptation*; Proceedings *of the International Conference on Acoustics, Speech and Signal Processing* (ICASSP-90) (IEEE, 1990) vol. 3, p. 1699; 4 pages.

* cited by examiner

SYSTEMS AND TECHNIQUES FOR COMMUNICATION USING COMBINED ORBITAL ANGULAR MOMENTUM AND MULTIPLE-INPUT-MULTIPLE-OUTPUT PROCESSING

CROSS-REFERENCE TO RELATED APPLICATIONS

This application claims the benefit and priority of U.S. Provisional Application No. 62/264,030, entitled "SYSTEMS AND TECHNIQUES FOR COMMUNICATION USING COMBINED ORBITAL ANGULAR MOMENTUM AND MULTIPLE-INPUT-MULTIPLE-OUTPUT PROCESSING," filed on Dec. 7, 2015, the entire disclosure of which is hereby incorporated by reference herein in its entirety.

STATEMENT AS TO FEDERALLY SPONSORED RESEARCH

This invention was made with government support under contract number FA9550-16-C-0008 awarded by Air Force Office of Scientific Research (AFOSR). The government has certain rights in this invention.

BACKGROUND

Line of sight (LoS) communication systems are useful for various situations. For example, many cellular telephones communicate via LoS in radio frequency bands. Furthermore, LoS systems may allow for communication to occur after a disaster has struck and other means of communication are unavailable.

Free-space optical (FSO) communications can provide an alternate solution to radio frequency communications for a variety of line-of-sight applications. Due to the continuous desire for increased bandwidth and communication systems, there is interest in utilizing advanced multiplexing techniques to achieve an increase in data capacity in a FSO system. In addition to wavelength division multiplexing and polarization division multiplexing, the use of multiplexing in the spatial domain has attracted a fair amount of attention.

The conventional approach to multiplexing in the spatial domain uses multiple spatially separated transmitter antennas. In such a system, each data-carrying beam is received with multiple spatially separated receivers and the beams are processed to recover the different data streams. This processing may reduce the crosstalk that appears from one beam into the receiver antenna intended for its spatially separated neighboring channel. However, such technology is relatively expensive to implement and the costs increase as the quantity of transmitters and receivers increase.

SUMMARY

Described herein is a system for free-space optical communication. The system includes a transmitter having a plurality of transmit devices each having an orbital-angular-momentum (OAM) multiplexer. Each OAM multiplexer is designed to convert each of a plurality of input signals into an OAM beam such that each of the plurality of transmit devices outputs a coaxial group of mutually orthogonal OAM beams. The system also includes a receiver. The receiver includes a plurality of receive devices each having an OAM demultiplexer designed to receive the coaxial group of mutually orthogonal OAM beams from a corresponding transmit device. The OAM demultiplexer is also designed to convert the coaxial group of mutually orthogonal OAM beams into a plurality of received signals corresponding to input signals represented by the coaxial group of mutually orthogonal OAM beams. A quantity of the plurality of receive devices is equal to a quantity of the plurality of transmit devices. The receiver also includes a multiple-input-multiple-output (MIMO) processor coupled to the plurality of receive devices. The MIMO processor includes an equalizer designed to determine a transfer function corresponding to crosstalk of each of the plurality of received signals. The MIMO processor is also designed to reduce the crosstalk of each of the plurality of received signals based on the transfer function and to continuously or periodically update the transfer function.

Also described is a method for free-space optical communication. The method includes converting, by an orbital-angular-momentum (OAM) multiplexer of each of a plurality of transmit devices, each of a plurality of input signals into an OAM beam. The method also includes outputting, by each of the plurality of transmit devices, a coaxial group of mutually orthogonal OAM beams. The method also includes receiving, by an OAM demultiplexer of each of a plurality of receive devices, the coaxial group of mutually orthogonal OAM beams from a corresponding transmit device, a quantity of the plurality of receive devices being equal to a quantity of the plurality of transmit devices. The method also includes converting, by the OAM demultiplexer of each of the plurality of receive devices, the coaxial group of mutually orthogonal OAM beams from the corresponding transmit device into a plurality of received signals corresponding to input signals represented by the coaxial group of mutually orthogonal OAM beams. The method also includes determining, by an equalizer of a multiple-input-multiple-output (MIMO) processor, a transfer function corresponding to crosstalk of each of the plurality of received signals. The method also includes reducing, by the equalizer of the MIMO processor, the crosstalk of each of the plurality of received signals based on the transfer function. The method also includes periodically or continuously updating, by the equalizer of the MIMO processor, the transfer function.

Also described is a system for free-space optical communication. The system includes a transmitter having a plurality of transmit devices each having an orbital-angular-momentum (OAM) multiplexer including at least one spatial light modulator and is designed to convert each of a plurality of input signals into an OAM beam such that each of the plurality of transmit devices outputs a coaxial group of mutually orthogonal OAM beams. The system also includes a receiver having a plurality of receive devices each having an OAM demultiplexer including at least one spatial light modulator and is designed to receive the coaxial group of mutually orthogonal OAM beams from a corresponding transmit device. The OAM demultiplexer is also designed to convert the coaxial group of mutually orthogonal OAM beams into a plurality of received signals corresponding to input signals represented by the coaxial group of mutually orthogonal OAM beams. A quantity of the plurality of receive devices is equal to a quantity of the plurality of transmit devices. The receiver also includes a multiple-input-multiple-output (MIMO) processor coupled to the plurality of receive devices and having an equalizer. The equalizer is designed to determine a transfer function corresponding to crosstalk of each of the plurality of received signals, to reduce the crosstalk of each of the plurality of received signals based on the transfer function, and to continuously or periodically update the transfer function.

The transfer function is represented by a matrix having dimensions of (N·M)×(N·M) where N represents a quantity of the plurality of transmit devices of the transmitter and M represents a quantity of OAM beams within each coaxial group of mutually orthogonal OAM beam, and each element in the matrix corresponds to a finite-impulse-response filter.

DETAILED DESCRIPTION

The orthogonality of a group of wave propagation modes could be used in a line-of-sight (LoS) communication system to increase the transmitted data rates. Different from traditional spatial multiplexing systems (such as those using multiple-input-multiple-output (MIMO) processing), such an orthogonal spatial mode system uses multiple co-axially propagating, spatially-overlapped modes or beams, each of which carries an independent data channel. Therefore, the total capacity and spectral efficiency (corresponding to bandwidth) of the communication system can be increased. The orthogonality of the data-carrying modes provide for efficient multiplexing and demultiplexing of each data channel.

An example of an orthogonal spatial mode set is orbital-angular-momentum (OAM) systems. The OAM systems are characterized by their spatial phase distribution. In particular, an OAM-carrying wave normally includes a phase term of $\exp(il\theta)$, in which l is known as the charge number of the OAM beam (which can be any integer value) and $\theta$ is the azimuthal angle. Due to the helical phase front of an OAM beam, an OAM beam with $l \neq 0$ has a doughnut-shaped intensity profile. (An OAM beam with l=0 is a special case, referred to as a Gaussian beam, and has a relatively flat phase front.) As l increases beyond 0, a width of the doughnut-shaped intensity profile increases. OAM is distinct from the phase rotation of polarization (polarization can be interpreted as the "spin" of the photons, which is a different quantum number from OAM, and can take on only two values: +½ and −½).

Another approach for simultaneously transmitting multiple independent data streams is to use MIMO-based spatial multiplexing, for which multiple aperture elements are employed at transmitter/receiver. This approach can provide capacity gains relative to single aperture systems and increase link robustness for free space optical (FSO) communications. In such a system, each data-carrying beam is received by multiple spatially separated receivers and MIMO signal processing is critical for reducing the crosstalk among channels and thus allows data recovery.

An OAM mode (i.e., an OAM beam) can also be interpreted as a beam with a phase front that "twists" in a helical fashion as it propagates, and beams with different (integer) l values are orthogonal to each other. This orthogonality enables efficient multiplexing and demultiplexing at the transmitter and receiver, respectively, with little crosstalk and thus not necessarily requiring further digital signal processing to overcome crosstalk effects. OAM multiplexing is possible within both the optical frequency range and the radio frequency (RF) range.

Figure 1:
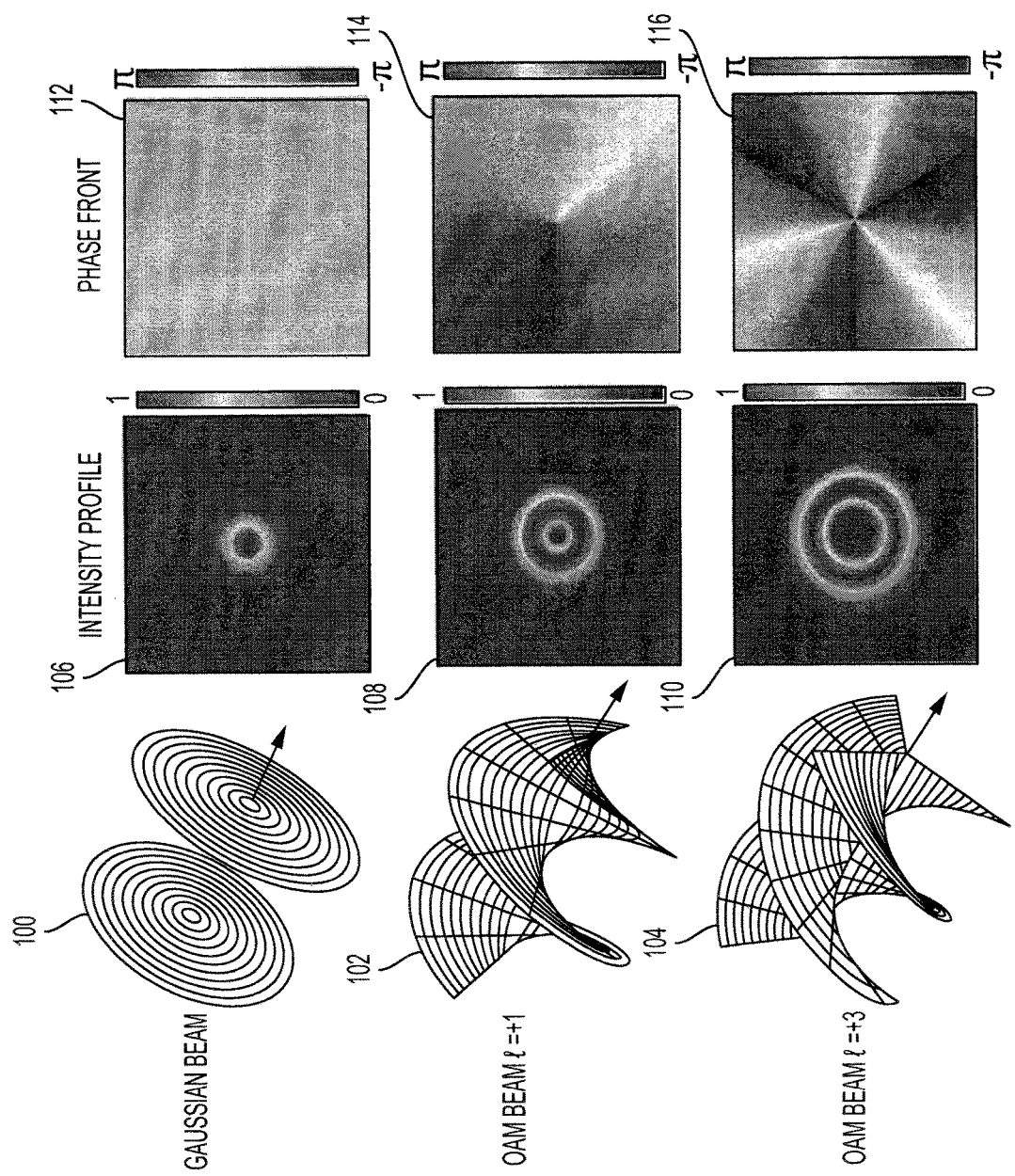
FIG. 1 illustrates an intensity and phase profile of a Gaussian beam and orbital-angular-momentum (OAM) beams having l=+1 and l=+3; a left column indicates a twisting wavefront of different OAM modes; the Gaussian beam can be regarded as a special case of an OAM mode with l=0 according to an embodiment of the present invention.

Referring to FIG. 1, a wavefront, intensity profile, and phase front is shown for an OAM beam with l=0, an OAM beam with l=1, and an OAM beam with l=3. In particular, a wavefront of the Gaussian beam 100 is shown to be relatively flat. The intensity profile 106 of the Gaussian beam may be circular, and the phase front 112 of the Gaussian beam is relatively stable throughout the wavefront.

On the other hand, a wavefront of the OAM beam 102 with l=1 is spiral or helical and the corresponding intensity profile 108 is doughnut-shaped with a "doughnut hole." The phase front 114 changes based on a current location about the circumference of the wavefront. A wavefront of the OAM beam 104 with l=3 is also helical and has a corresponding intensity profile 110 that is doughnut-shaped and has a greater width (and "doughnut hole") than the intensity profile 108 of the OAM beam with l=1. The phase front 116 changes in intensity about the circumference of the wavefront more frequently than the phase front 114 of the OAM beam with l=1. In particular, the phase changes in the angular direction are 2π for l=+1 and 6π for l=+3, respectively.

The present disclosure is directed to a FSO communication system that combines OAM multiplexing and MIMO multiplexing. The disclosure provides results of experimentation of such a system that utilizes 2 transmit/receive aperture pairs (i.e., 2 transmit devices and 2 receive devices) that each communicate via a group of two mutually orthogonal OAM beams. The disclosed system approach can be potentially extended into a more general system that combines N aperture pairs (N transmit devices and N receive devices), each aperture pair transmitting/receiving M coaxial OAM beams.

The present disclosure provides advantages such as increased bandwidth relative to other communication systems. For example, a system disclosed herein may provide a greater number of achievable data channels than the use of OAM multiplexing or MIMO multiplexing alone. Moreover, this method could provide flexibility in system design given a fixed transmitter and receiver spatial volume.

Experimentation was performed using an 80 gigabit per second (Gbit/s) FSO link using OAM multiplexing combined with MIMO-based spatial multiplexing. In particular, the system includes two transmit devices and two receive devices (i.e., 2 aperture pairs), each transmit device designed to transmit a group of two coaxial multiplexed OAM beams (one with l=+1 and one with l=+3). The OAM beams from one transmitter aperture spatially overlap those from the other aperture at the plane at which the receive devices receive the beams, resulting in crosstalk between non-coaxial OAM channels. A 4×4 MIMO digital signal processor (DSP, MIMO processor) is used to mitigate the channel crosstalk. Results of experimentation illustrate that the bit-error rates (BERs) for all channels can reach below 3.8× 10−3 after MIMO processing, indicating that the two spatial multiplexing techniques can be compatible with and complement each other.

Discussion will now turn to generation and multiplexing of FSO OAM beams. As described above and shown in FIG. 1, an OAM beam with l=0 (i.e., Gaussian beam) is the conventional beam emitted by FSO systems. The far-field intensity profile of the Gaussian beam follows a two-dimensional Gaussian distribution, with the maximum intensity located in the center of the beam. The Gaussian beam also has a unique phase front. In contrast, relatively high order OAM beams (i.e., OAM beams with l≠0) have a doughnut-like intensity profile and a spiral or helical wavefront phase.

The charge number of OAM beams can be a positive or negative value. For an OAM beam with a negative charge number, the phase increases in the clockwise direction, while for an OAM beam with a positive charge number, the phase increases in the counterclockwise direction.

Figure 2:
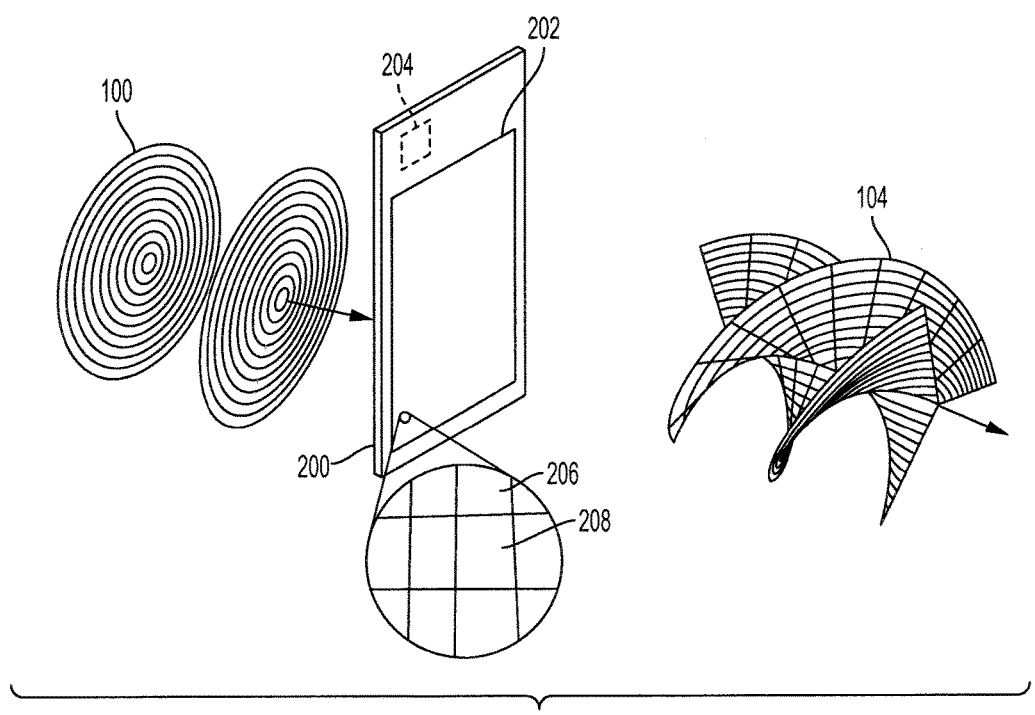
FIG. 2 illustrates generation of an OAM beam from a Gaussian beam by passing the Gaussian beam through a spatial light modulator according to an embodiment of the present invention.

OAM beams may be formed in a variety of manners. For example, OAM beams may be formed using a parabolic antenna or reflector, another specially designed antenna array, a spiral phase plate (SPP), or the like. However, due to the relatively high frequency of FSO systems (i.e., between 100 GHz and $10^{-17}$ hertz, or between 1 terahertz (THz) and $10^{-15}$ hertz) such beam formation techniques may not generate OAM beams with sufficiently high quality wavefront distortions. Thus, in referring to FIG. 2, a spatial light modulator (SLM) 200 may be used to form each OAM beam.

The SLM 200 may include a display 202 and a SLM controller 204. The display 202 may include a plurality of pixels including a pixel 206 and a pixel 208. The SLM controller 204 may independently control each pixel of the display 202.

The Gaussian beam 100 may be propagated through the display 202. The SLM controller 204 may independently control the pixels of the display 202 to turn on and off in a desired pattern to modulate the wavefront of the beam as it transfers through the display 202. The SLM controller 204 may control the display 202 based on a desired l value. For example, the SLM controller 204 is designed to control the display 202 to convert the Gaussian beam 100 into the OAM beam 104 with l=+3. However, if desired, the SLM controller 204 may be programmed to convert the Gaussian beam 100 into another OAM beam with any l value. In order to convert the OAM beam 104 with l=+3, the OAM beam 104 may be propagated through another SLM 200 configured to generate an OAM beam with l=−3. Combining an OAM beam with l=+3 and an OAM beam with l=−3 results in an OAM beam with l=0, i.e., a Gaussian beam.

Figure 3:
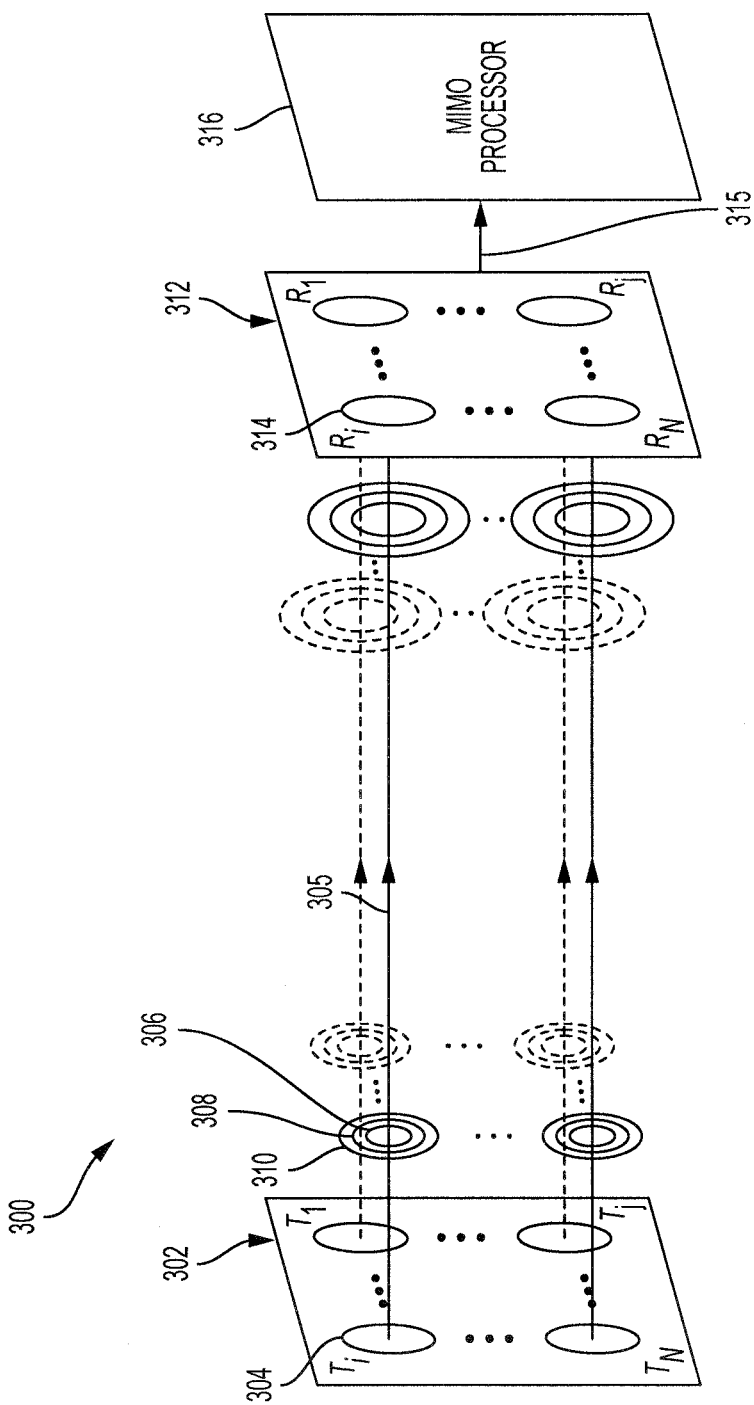
FIG. 3 is a block diagram illustrating a system for free space optical communications using N transmit devices each transmitting a group of M coaxial and mutually orthogonal OAM beams according to an embodiment of the present invention.

Turning to FIG. 3, a system 300 for free space optical communications using two forms of spatial multiplexing is shown. The system 300 includes a transmitter 302 and a receiver 312. The transmitter 302 includes a plurality of transmit devices 304 including N transmit devices 304. Each transmit device is designed to output a coaxial group of mutually orthogonal OAM beams 305 having M coaxial beams. As shown in FIG. 3, the coaxial group of mutually orthogonal OAM beams 305 includes three OAM beams including a first OAM beam 306, a second OAM beam 308, and a third OAM beam 310.

The receiver 312 includes a plurality of receive devices 314 including N receive devices 314. The coaxial group of mutually orthogonal OAM beams 305 from each of the plurality of transmit devices 304 is received by one of the plurality of receive devices 314. Each of the plurality of receive devices 314 may demultiplex the corresponding group of OAM beams 305 into M received signals each corresponding to a separate Gaussian beam. The receiver 312 may output a plurality of received signals 315 including the separate Gaussian beams from each of the receive devices 314.

The system 300 may also include a MIMO processor 316 (i.e., a logic device, such as a processor, a microprocessor, a FPGA, or the like, that runs a MIMO equalization algorithm). In some embodiments, the MIMO processor 316 may be separate from the receiver 312 or may be combined with the receiver 312. The MIMO processor 316 may receive the plurality of received signals 315 from the receiver 312 and may reduce or eliminate interference between the plurality of received signals 315. In particular, the MIMO processor 316 may include an equalizer that can determine a transfer function corresponding to crosstalk of each of the plurality of received signals. The MIMO processor 316 may also reduce the crosstalk of each of the plurality of received signals 315 based on the transfer function, and may continuously or periodically update the transfer function as will be described with more detail below.

Although the system 300 is shown with each of the plurality of transmit devices 304 and each of the plurality of receive devices 314 in a rectangular configuration, the present disclosure is not limited to such a configuration.

The system 300 may be scalable. In that regard, the transmitter 302 and the receiver 312 may include any quantity of transmit devices 304 and receive devices 314. Likewise, each of the transmit devices 304 may transmit any quantity of mutually orthogonal OAM beams.

Figure 4:
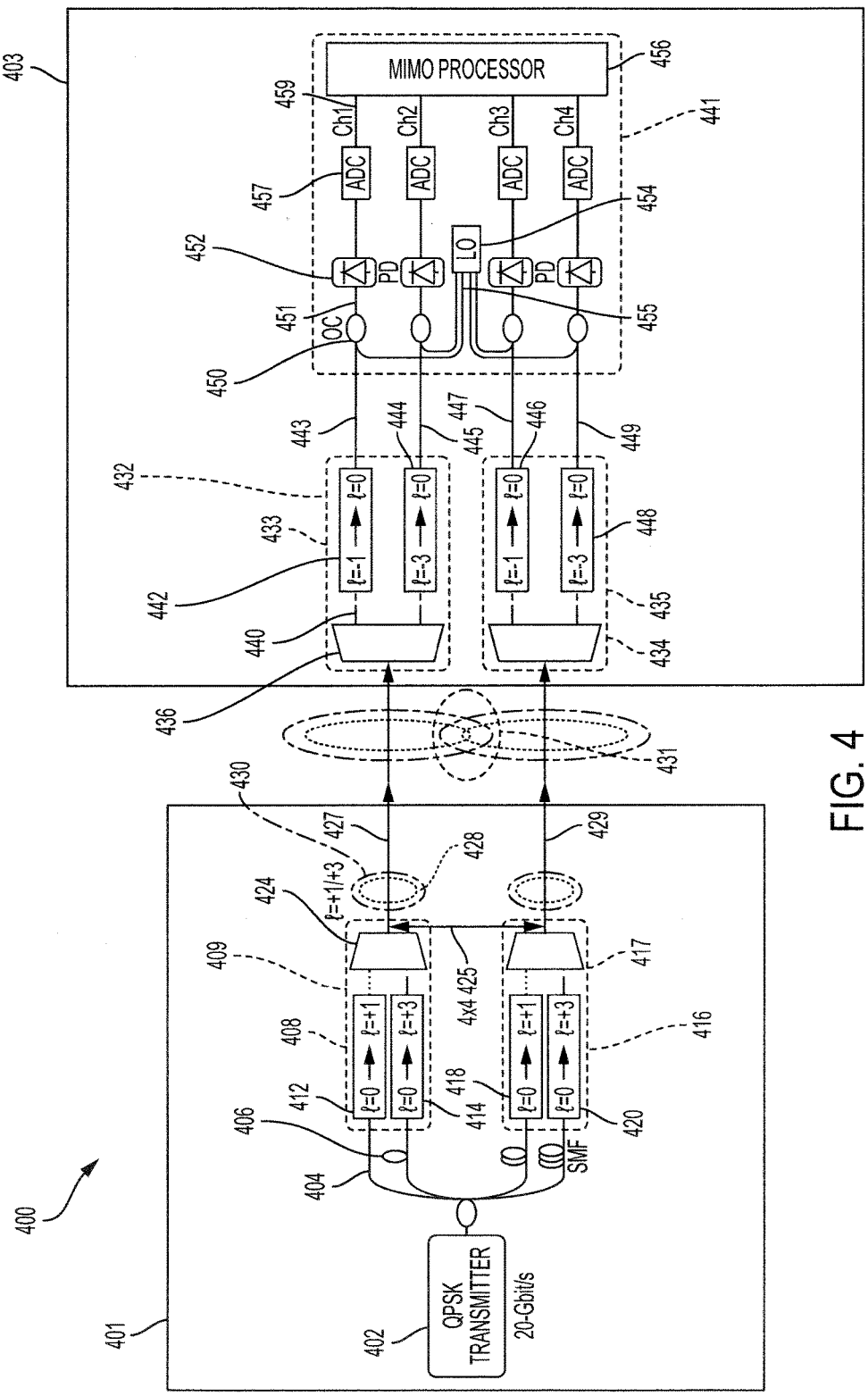
FIG. 4 is a block diagram illustrating a system for free space optical communications using two transmit devices each transmitting a group of two coaxial and mutually orthogonal OAM beams according to an embodiment of the present invention.

Turning to FIG. 4, another system 400 for FSO communications is shown. The system 400 includes a transmitter 401 and a receiver 403. The system 400 was used to perform experimentation and thus includes a 20-Gbit/s quadrature phase-shift keying (QPSK) transmitter 402 for generating a QPSK signal at 1550 nm (194 Terahertz (THz)). The QPSK transmitter 402 outputs a single signal that is divided into 4 separate copies of the signal. The 4 copies of the signal may be referred to as a plurality of input signal 404. In a non-experimentation setting, the input signals 404 may be provided from one or more components other than a signal generator.

The transmitter 401 includes a plurality of transmit devices including a first transmit device 408 and a second transmit device 416. The first transmit device 408 includes a first OAM multiplexer 409. The second transmit device 416 includes a second OAM multiplexer 417. Each of the transmit devices 408, 416 includes two transmit SLMs. In particular, the first transmit device 408 includes a first transmit SLM 412 and a second transmit SLM 414. The second transmit device 416 includes a third transmit SLM 418 and a fourth transmit SLM 420. The first transmit SLM 412 and the third transmit SLM 418 are designed to convert a Gaussian input signal into an OAM beam with l=+1. The OAM beams with l=+1 may have a beam size of approximately 3.3 mm. The second transmit SLM 414 and the fourth transmit SLM 420 are designed to convert a Gaussian input signal into an OAM beam with l=+3. The OAM beams with l=+3 may have a beam size of approximately 4.5 mm.

Each of the 4 copies of the signal output by the QPSK transmitter 402 is provided through a separate single mode optical fiber (SMF) 406. Each SMF 46 has a separate length such that each of the input signals 404 has a different time delay when received by the corresponding SLM such that each of the input signals 404 appear different from each other.

The first transmit device 408 further includes a first signal multiplexer 424. The first signal multiplexer 424 receives the OAM beam output by the first transmit SLM 412 and the OAM beam output by the second transmit SLM 414. The first signal multiplexer 424 multiplexes the two OAM beams into a coaxial group of mutually orthogonal OAM beams 427. The group of OAM beams 427 includes a first OAM beam 428 and a second OAM beam 430. The OAM beams 428, 430 are coaxially located and mutually orthogonal relative to each other. The second transmit device 416 also includes a signal multiplexer and is designed to output a second coaxial group of mutually orthogonal OAM beams 429.

The first transmit device 408 and the second transmit device 416 may be separated by a distance 425. The distance 425 used in the experiment was approximately 11 mm. The distance 425 may be sufficiently small that the groups of OAM beams 427, 429 output by each transmit device 408, 416 have an overlap 431 at a receive plane of the receiver 403. Such an overlap simulates use in a real-time environment.

The receiver 403 includes a first receive device 432 having a first OAM demultiplexer 433 and a second receive device 434 including a second OAM demultiplexer 435. The first receive device 432 is designed to receive the first group of OAM beams 427 and the second receive device 434 is designed to receive the second group of OAM beams 429. Each of the receive devices 432, 434 is separated from the corresponding transmit device 408, 416 by a distance, such as approximately 1 m. The distance is sufficiently great to provide for the overlap 431. The overlap 431 results in crosstalk between the groups of OAM beams 427, 429 such that the first receive device 432 receives the group of OAM beams 427 and a portion of the group of OAM beams 429. In some embodiments, the first receive device 432 may be separated from the second receive device 434 by the distance 425 and, in some embodiments, it may be separated by a distance other than the distance 425.

The first receive device 432 includes a first signal demultiplexer 436 designed to receive the group of OAM beams 427 and split the group of OAM beams 427 into two copies 440. The first receive device 432 includes a first receive SLM 442 and a second receive SLM 444. Each of the first receive SLM 442 and the second receive SLM 444 receive one of the two copies 440 of the group of OAM beams 427. The second receive device 434 also includes a signal demultiplexer that outputs to copies of the group of OAM beams 429, one each to a third receive SLM 446 and a fourth receive SLM 448.

The first receive SLM 442 and the third receive SLM 446 are each designed to convert a Gaussian beam into an OAM beam with l=−1. The second receive SLM 444 and the fourth receive SLM 448 are each designed to convert a Gaussian beam into an OAM beam with l=−3. In that regard, the first receive SLM 442 converts the first OAM beam 428 (having l=+1) into a first received signal 443 that corresponds to a Gaussian beam. Likewise, the second receive SLM 444 converts the second OAM beam 430 into a second received signal 445 that corresponds to a Gaussian beam. The third receive SLM for 46 and the fourth receive SLM 448 similarly output received signals 447, 449, respectively, that each correspond to a Gaussian beam. Each of the received signals 443, 445, 447, 449 corresponds to one of the plurality of input signals 404.

The receiver 403 further includes a heterodyne detection unit 441. In some embodiments, the heterodyne detection unit 441 may be physically separate from the receiver 403. The heterodyne detection unit 441 may receive each of the received signals 443, 445, 447, 449 and may detect and analyze each of the received signals 443, 445, 447, 449 to determine data transmitted via the plurality of input signals 404.

In particular, the heterodyne detection unit 441 includes a plurality of optical couplers (OCs) 450 each designed to receive one of the received signals 443, 445, 447, 449. A local oscillator (LO) 454 is designed to output a periodic signal 455 having a predetermined frequency. For example, the predetermined frequency may be approximately 10 GHz different from the frequency of the received signals 443, 445, 447, 449. Stated differently, the predetermined frequency may be between 8 GHz and 12 GHz above or below the frequency of one or more of the received signals 443, 445, 447, 449.

Each of the optical couplers 450 may receive a copy of the periodic signal 455. The optical couplers 450 may combine the periodic signal 455 with the corresponding received signal 443, 445, 447, 449 in order to reduce a frequency of the received signals 443, 445, 447, 449. Each of the optical couplers 450 may output an output signal 451 corresponding to one of the received signals 443, 445, 447, 449 with a reduced frequency. Such reduction of frequency may increase the ease of detection of the corresponding signal.

The heterodyne detection unit 441 may further include a plurality of photodiodes (PD) 452. Each of the photodiodes 452 may be coupled to one of the optical couplers 450 and receive the corresponding output signal 451. The photodiodes 452 may detect the output signal 451 from the corresponding optical coupler 450. The signal detected by the photodiodes 452 may be an analog signal.

In that regard, the heterodyne detection unit 441 may include a plurality of analog-to-digital converters (ADC) 457 each coupled to one of the plurality of photodiodes 452. Each of the analog-to-digital converters 457 may convert a corresponding detected output signal 451 into a digital output signal 459. In some embodiments, the function of the analog-to-digital converters 457 may be performed by a four-channel real-time scope. In the experiment, the scope was used with a sampling rate of 40 Gsample/second on each channel. The sampled data was then recorded for off-line signal processing.

The components of the heterodyne detection unit 441 may reduce hardware complexity relative to other detection units because each QPSK channel may be detected using a single photodiode and a single analog-to-digital converter.

The heterodyne detection unit 441 may further include a MIMO processor 456. The MIMO processor 456 may process the detected and converted output signals 451 to recover data represented by the plurality of input signals 404 and to calculate the bit error rate (BER) for each channel.

Figure 5:
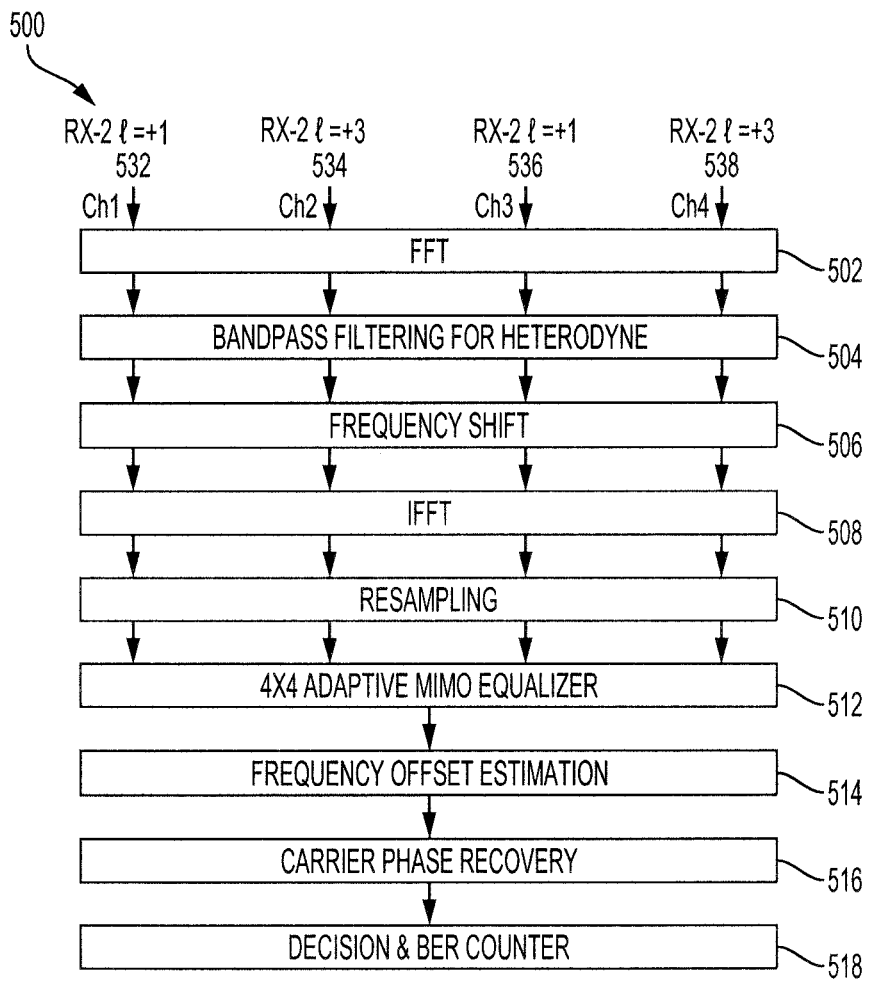
FIG. 5 is a flowchart illustrating a method for offline signal processing by a MIMO processor according to an embodiment of the present invention.
Figure 6A:
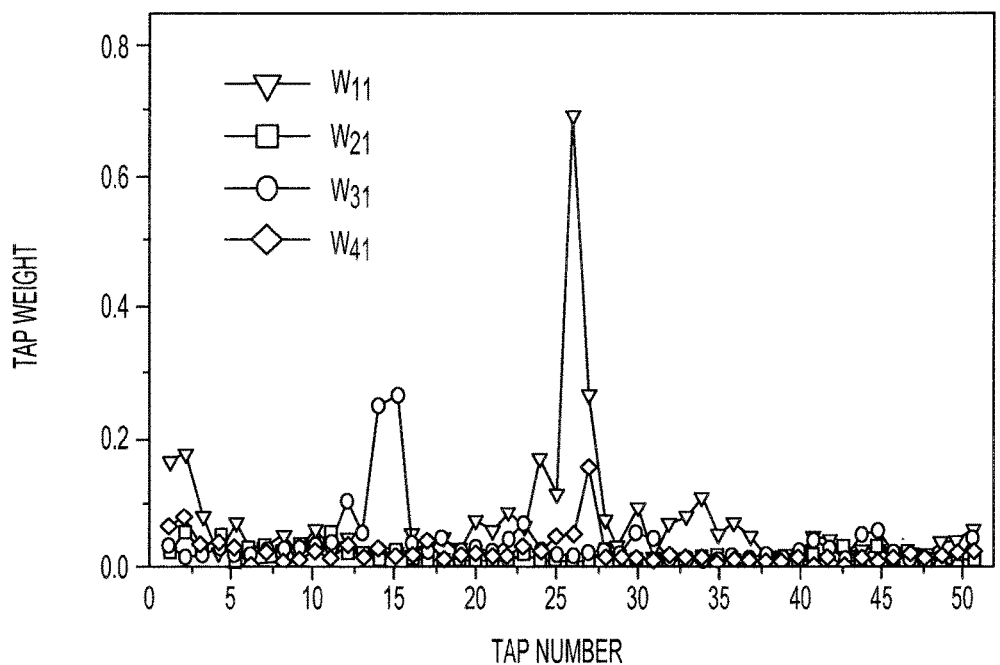
FIGS. 6A-6D are charts illustrating convergent tap weights (i.e., FIR filter coefficients) of an equalizer of a MIMO processor using a constant modulus algorithm; absolute values of the tap weights of the four FIR filters being used to equalize received signals corresponding to transmitted OAM beams according to an embodiment of the present invention.
Figure 6B:
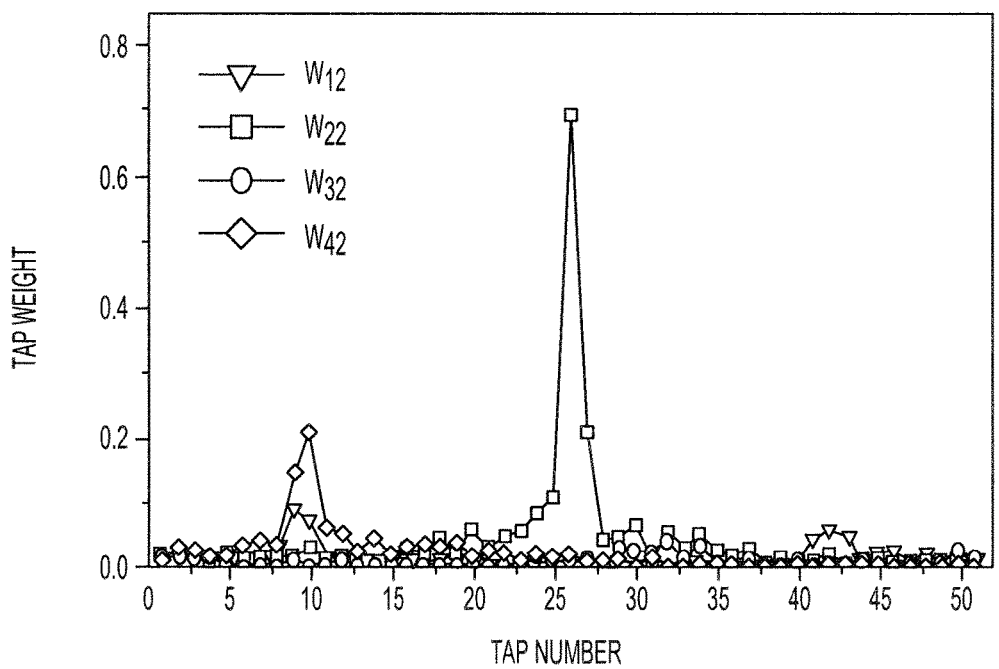
Figure 6C:
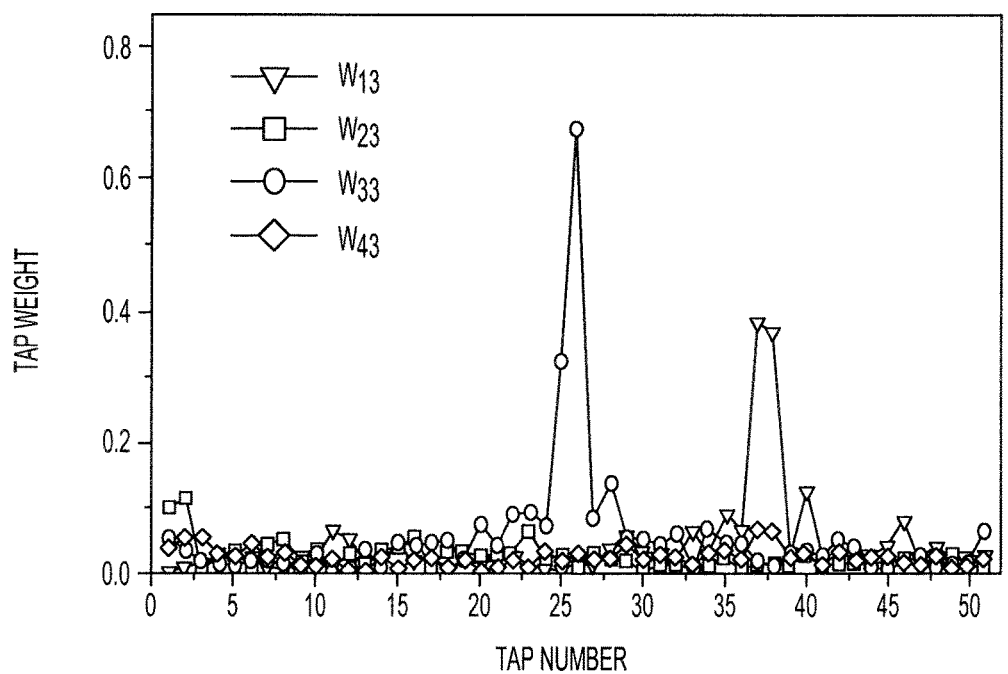
Figure 6D:
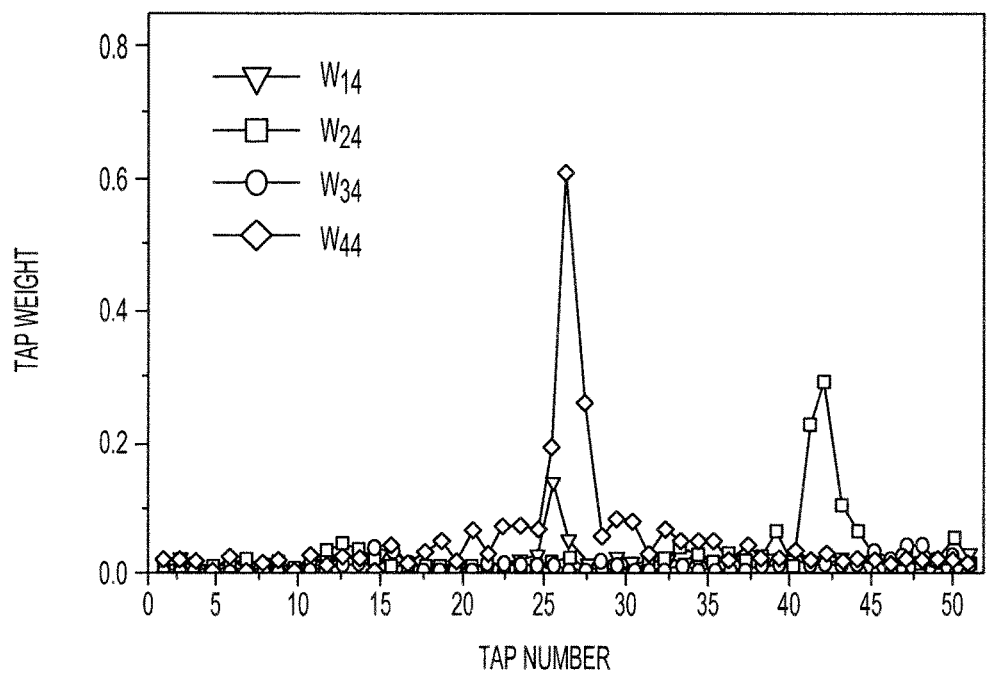

Referring to FIGS. 4 and 5, a method 500 may be performed by a MIMO processor, such as the MIMO processor 456. The MIMO processor 456 may further demodulate the detected and converted output signals 451 (shown as signals 532, 534, 536, 538 in FIG. 5) due to the difference in modulation frequencies between the frequency of the QPSK transmitter 402 and the local oscillator 454. In that regard and returning reference to FIG. 5, the method 500 may include a plurality of steps for demodulating the signals 532, 534, 536, 538.

In block 502, each of the signals 532, 534, 536, 538 may be converted from a time domain signal into a frequency domain signal. For example, the MIMO processor may use a Fourier transform (FT) or a fast Fourier transform (FFT) for such a conversion.

In block 504, each of the signals 532, 534, 536, 538 may be bandpass filtered for heterodyne. The bandpass filter may be performed around a third frequency that corresponds to a difference between the first frequency (of the QPSK transmitter 402 of FIG. 4) and the second frequency (of the local oscillator 454 of FIG. 4).

In block 506, the frequency of each of the signals 532, 534, 536, 538 may be shifted by the third frequency. This shifting of the frequencies may cause each of the signals 532, 534, 536, 538 to return to the baseband frequency of the original input signals.

In block 508, each of the signals 532, 534, 536, 538 is transformed from a frequency domain signal into a time domain signal. For example, this may be performed using an inverse Fourier transform (IFT) or an inverse fast Fourier transform (IFFT).

In block 510, each of the signals 532, 534, 536, 538 may be re-sampled, such as at a sampling rate of 5 samples per symbol.

In block 512, the method 500 may use an equalizer of the MIMO processor to reduce interference between each of the signals 532, 534, 536, 538. Generally, the equalizer may estimate the interference of each channel and may reduce or eliminate the interference based on the estimated interference.

In particular, the equalization process is an adaptive MIMO equalization algorithm which utilizes a linear equalizer for each channel that can blindly estimate the channel power transfer matrix and reduce the interference/crosstalk of the corresponding channel.

The equalizer utilizes a channel transfer matrix H. A channel transfer matrix H may have dimensions (N·M)×(N·M), where N represents the quantity of the transmit devices and M represents the quantity of OAM beams transmitted by each of the transmit devices.

The channel transfer matrix H, between N·M OAM channels can be written as:

$$H = \begin{bmatrix} h_{1,1} & h_{1,2} & \cdots & h_{1,N} \\ h_{2,1} & h_{2,2} & \cdots & h_{2,N} \\ \vdots & \vdots & \ddots & \vdots \\ h_{N,1} & h_{N,2} & \cdots & h_{N,N} \end{bmatrix}_{NM \times NM}$$

where $h_{i,j}$ is an M×M matrix representing the transfer function between OAM channels from a transmit device $T_j$ to a receive device $R_i$. It is desirable for $h_{i,j}$ to be a diagonal matrix due to the orthogonality among the M transmitted coaxial OAM beams. H is determined based on overlaps between OAM beams at the receiver, which are directly related to the propagation distance and spacing between each transmit device and between each receive device. The total crosstalk of each OAM channel can be estimated from H. In order to mitigate inter-channel crosstalk, (N·M)×(N·M) MIMO processing is employed by the MIMO processor. Given that H is symmetric and has N diagonal M×M sub-matrices along its main diagonal line, a relatively small quantity of other channels requires consideration when equalizing a specific channel, thus potentially reducing computation complexity.

The equalizer may be based on a constant modulus algorithm (CMA) to mitigate crosstalk between the channels. For a 4×4 MIMO system (where M=2 and N=2), the equalizer includes 16 adaptive finite-impulse-response (FIR) filters each with a tap number of K. Each $h_{i,j}$ corresponds to a FIR filter. The tap number K in each FIR filter is set to be 51, which is sufficient to cover the differential time delays among each channel. The output of the equalizer corresponding to each channel can be expressed using equation 1 below:

$$y_j = \sum_{i=1}^{4} \vec{w}_{ij} * \vec{x}_i, \qquad \text{(eq. 1)}$$
$$j = 1, 2, 3, 4$$

In equation 1, * represents a convolution operation, and $\vec{w}_{ij}$ (i=1,2,3,4) is the coefficient vector of the FIR filter, has a vector length of K (the tap number), and corresponds to the interference. $\vec{x}_i$ represents the input signal vector of the i-th channel (i.e., the received signal). $y_j$ represents the received signal after equalization. $\vec{w}_{ij} * \vec{x}_i$ represents the inner product operation between the two vectors. $y_i$ represents the output of the FIR filter. All of the FIR coefficients are initialized to 0, and then periodically or continuously updated until the coefficients converge based on the constant modulus algorithm (CMA) shown below in equation 2:

$$\vec{w}_{ij}(k+1) = \vec{w}_{ij}(k) + \text{stepsize} \cdot e_i \cdot y_i \cdot \vec{x}_i^* \qquad \text{(eq. 2)}$$

In equation 2, $e_i = P_{ref} - |y_i|^2$ represents the error signal of the adaptive estimation (i.e., the bit error after equalization), $P_{ref}$ represents the normalized reference power of the 16-QAM signal, and stepsize is a constant value.

It is known that interference/crosstalk is present between $\vec{x}_i^*$ and $y_i$. Equations 1 and 2 above are used to estimate $\vec{w}_{ij}$. For each iteration (K+1), $\vec{w}_{ij}$ is updated. After sufficient iterations, $\vec{w}_{ij}$ converges to a relatively accurate representation of the coefficient vector. If stepsize is selected to be relatively large then $\vec{w}_{ij}$ may converge relatively quickly and may optimally converge in the short term (locally). If stepsize is selected to be relatively small then $\vec{w}_{ij}$ may converge relatively slowly and may optimally converge in the long-term (globally).

The obtained FIR filter coefficients are used to equalize the crosstalk among the four QPSK OAM channels shown in FIG. 4 based on the equalizer equation 1. As an example, each of FIGS. 6A-6D illustrate tap weights of four FIR filters ($w_{11}$, $w_{21}$, $w_{31}$, and $w_{41}$) used to generate the equalized outputs for a first channel (the OAM beam with l=+1 received by the first receive device 432), a second channel (the OAM beam with l=+3 received by the first receive device 432), a third channel (the OAM beam with l=+1 received by the second receive device 434), and a fourth channel (the OAM beam with l=+3 received by the second receive device 434), respectively. It is apparent that the tap weights of the FIR filters corresponding to coaxial OAM channels are relatively low (less than 0.1, generally) for the equalization of a specific channel, due to the negligible crosstalk resulting from OAM beam orthogonality.

After equalization in block 512, frequency offset estimation and carrier phase recovery are performed in blocks 514 and 516, respectively. For example, these functions may be performed using Fourier transforms and/or fast Fourier transforms (along with corresponding inverse transforms). Frequency offset estimation and carrier phase recovery are used to adjust the frequencies and phases of the received signals to values relatively near the frequencies and phases of the corresponding input signals. For example and with brief reference to FIG. 4, the QPSK transmitter 402 may have a frequency that is less than or greater than the desired frequency of 194 THz, the local oscillator 454 may have a frequency that is less than or greater than its desired frequency, and/or each may have a slightly different phase. Returning to FIG. 5, blocks 514 and 516 may determine such frequency and/or phase offsets and may adjust the received signals to remove the frequency and/or phase offsets.

In block 518, the MIMO processor may make a decision regarding each signal and may perform bit error rate counting. The received signals after equalization and recovery may have values that are between absolute values of 0 and 1. The MIMO processor may determine whether each character of each signal corresponds to a 0 or a 1. For example, the MIMO processor may determine that values above a threshold, such as 0.5, correspond to a 1 and values below or equal to the threshold correspond to a 0.

For BER measurement, the BER of OAM channels with l=+1 and l=+3 for a single transmit device may be measured when the single transmit device is on and the other transmit device is off. In this case, no mutual crosstalk effects exist between channels from alternative transmit devices.

The power leakage and crosstalk between all four OAM channels are shown in Table 1 below. Referring to FIG. 4, the power leakage is measured in the following way: first, a signal is transmitted over the OAM beam 428 with l=+1 from the first transmit device 408 while all the other beams (OAM beam 430 with l=+3 in the first transmit device and OAM beams with l=+1 and l=+3 in the second transmit device 416) are off. The received power for each channel (the OAM beams with l=+1 and l=+3 for both receive devices 432, 434) is then recorded. The above measurements are repeated for all transmitted OAM channels until a full 4×4 power transfer matrix is obtained, from which the total crosstalk of a specific channel can be calculated. The crosstalk between coaxial OAM channels is below −20 dB and relatively major power transfer occurs among non-coaxial channels, as expected, due to the beam overlap between non-coaxial beams. This transfer matrix is directly related to the convergent tap weights of MIMO processing shown in FIGS. 6A-6D.

TABLE 1

The power transfer and total crosstalk of each OAM beam.

| Power Transfer (dBm) | $T_1l = +1$ | $T_1l = +3$ | $T_2l = +1$ | $T_2l = +3$ | Crosstalk |
|---|---|---|---|---|---|
| $R_1l = +1$ | −9.1 | −31.3 | −21.2 | −22.4 | −9.4 dB |
| $R_1l = +3$ | −37.8 | −9.0 | −33.0 | −21.2 | −11.8 dB |
| $R_2l = +1$ | −20.8 | −33.3 | −10.5 | −38.7 | −10.0 dB |
| $R_2l = +3$ | −23.6 | −21.3 | −30.1 | −10.1 | −8.8 dB |

Figure 7:
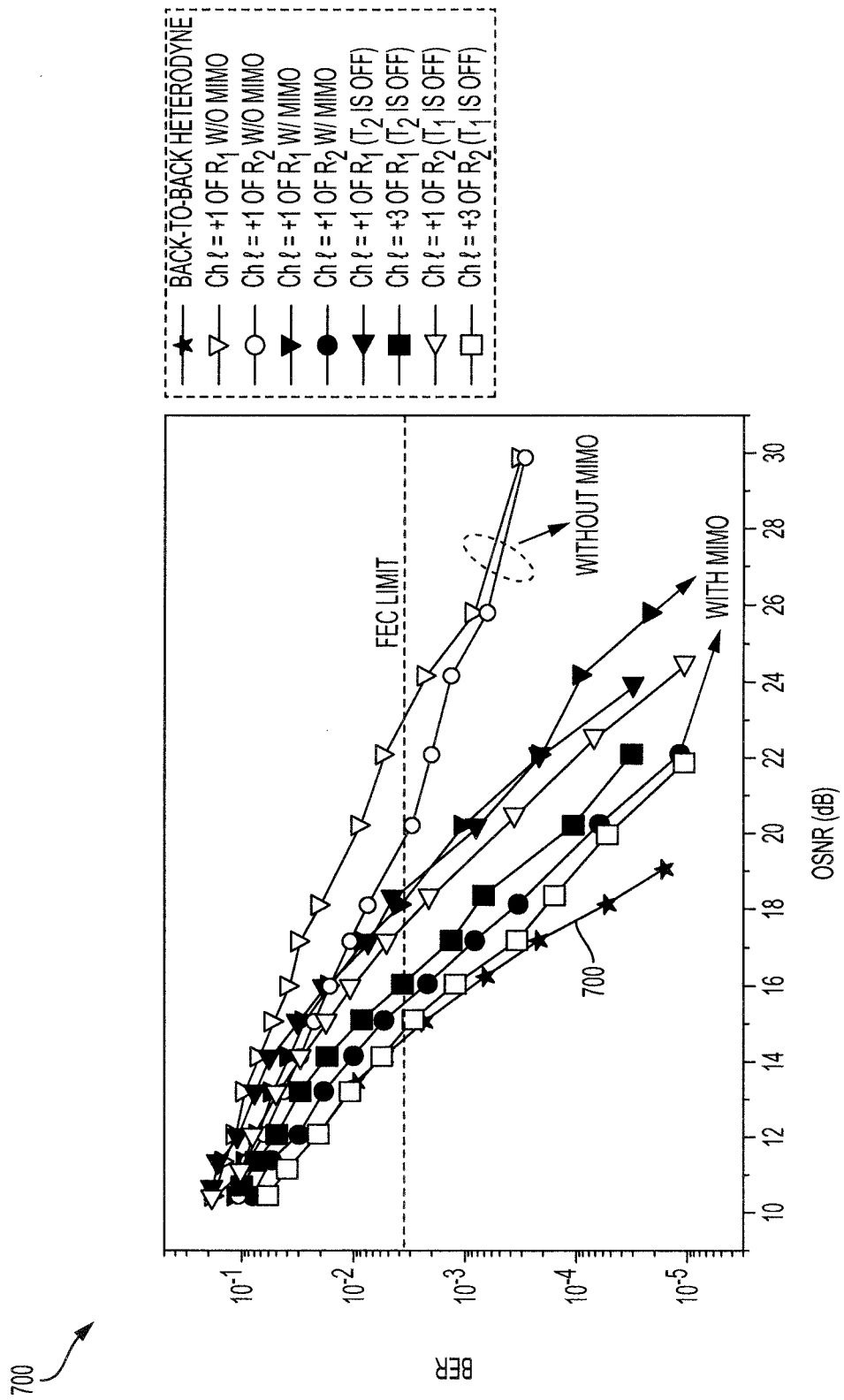
FIG. 7 is a chart illustrating: bit error rates for OAM beams with l=+1 from a first transmit device and a second transmit device while OAM beams with l=+3 are turned off; bit error rates for OAM beams with l=+1 and l=+3 in the first transmit device while the second transmit device is off; and bit error rates for OAM beams with l=+1 and l=+3 in the second transmit device while the first transmit device is off according to an embodiment of the present invention.

FIG. 7 is a chart 700 illustrating the BERs as a function of optical signal-to-noise ratio (OSNR) for the OAM beams with l=+1 from both transmit devices 408, 416 when the channels corresponding to OAM beams with l=+3 are not transmitting. The BER curve for the back-to-back (B2B) heterodyne case is also provided as a benchmark. The mutual crosstalk values between the two channels are −12.1 dB and −10.3 dB, as shown in Table 1. We see that with 2×2 MIMO signal processing, the power penalties at the forward error correction (FEC) limit of 3.8×10-3 with respect to the B2B case are reduced from 5.3 dB and 8.4 dB to 1.1 dB and 3.7 dB for the two OAM beams with l=+1, respectively. FIG. 4 also depicts BERs for OAM beams with l=+1 and l=+3 from the first transmit device 408 when the second transmit device 416 is off, along with BERs for OAM beams with l=+1 and l=+3 from the second transmit device 416 when the first transmit device 408 is off. Such measurements represent the situation where is no crosstalk from between the beams transmitted by the transmit devices 408, 416. The power penalties are observed to be less than 2.7 dB.

Figure 8:
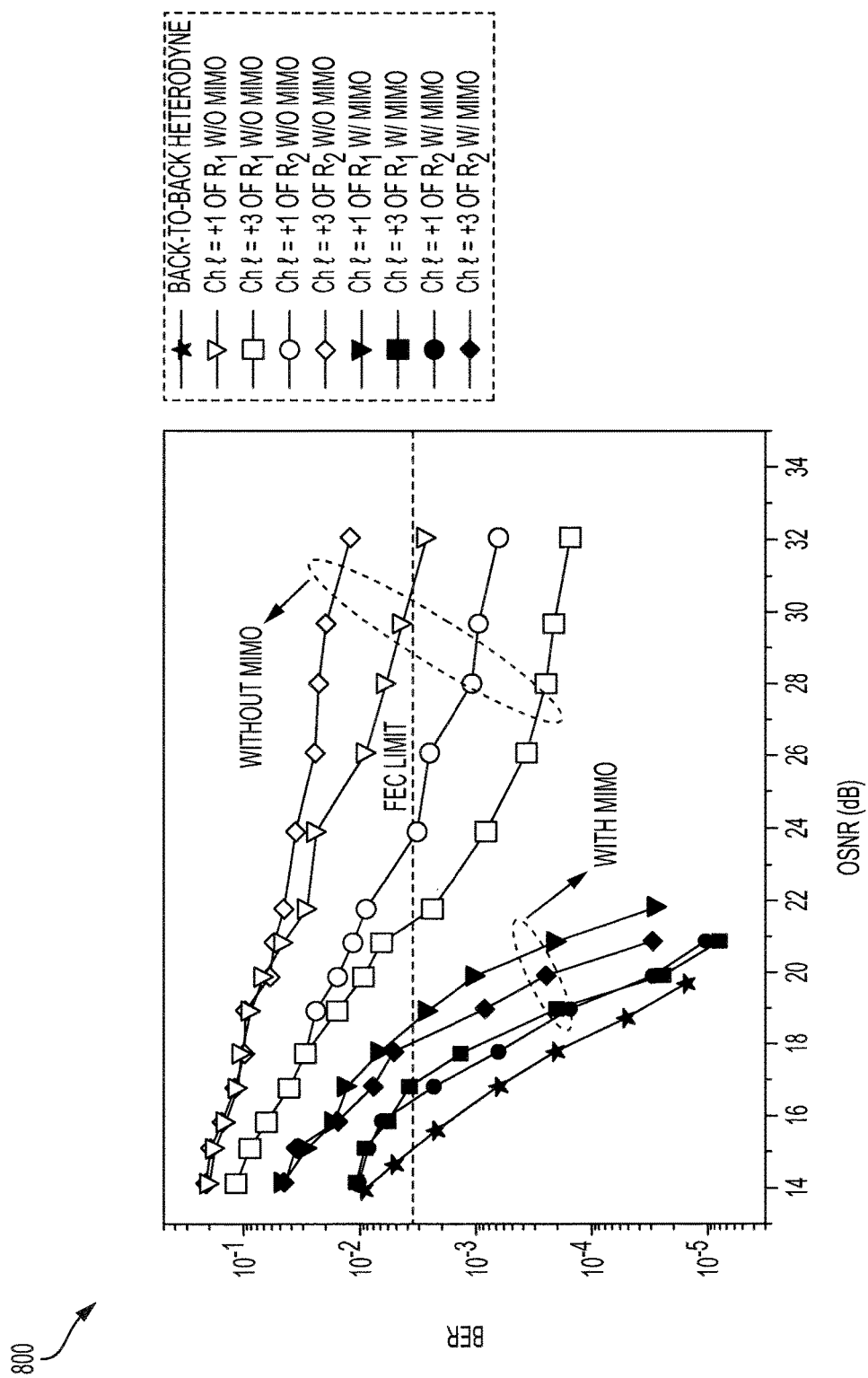
FIG. 8 is a chart illustrating measured bit error rates as a function of optical signal-to-noise ratio for four OAM channels (two OAM beams with each of l=+1 and l=+3) with and without MIMO processing according to an embodiment of the present invention.

FIG. 8 is a chart 800 illustrating BERs for all four channels with and without 4×4 MIMO processing when both of the transmit devices 408, 416 are turned on. It is apparent that without MIMO processing, all BERs are undesirably above the FEC limit when OSNR is smaller than 34 dB and that the BER curves exhibit the "error floor" phenomenon due to the strong crosstalk. After MIMO processing, all channel BERs dramatically decrease, reaching below 3.8× 10-3. The power penalties of all channels, compared to the B2B case, are below 3.6 dB.

Figure 9:
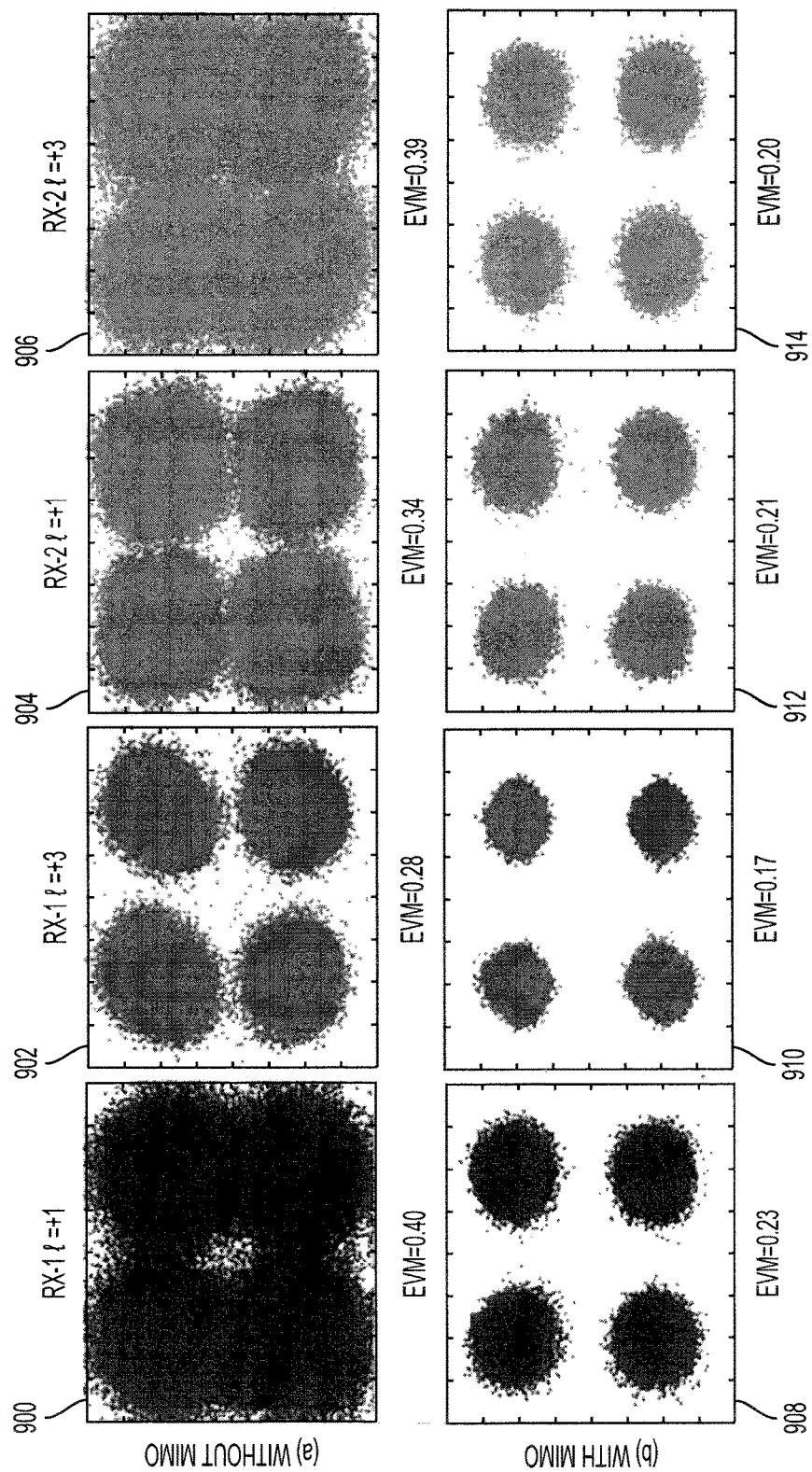
FIG. 9 shows various plots illustrating recovered constellations of 20 Gbit/s QPSK signals for each of four OAM beams (two with each of l=+1 and l=+3) at an optical signal-to-noise ratio of 24 dB without MIMO processing and with MIMO processing according to an embodiment of the present invention.

FIG. 9 illustrates constellations of the received QPSK signals and corresponding error vector magnitudes (EVMs). Plots 900, 902, 904, and 906 illustrate the constellations of the received signals from each OAM beam without MIMO processing. Plots 908, 910, 912, and 914 illustrate the constellations of the received signals from each OAM beam with MIMO processing. It is apparent that the OAM beam with l=+1 from the first transmit device 408 and the OAM beam with l=+3 from the second transmit device 416 without MIMO processing have larger EVMs than their counterparts, due to larger crosstalk values as shown in Table 1. It is apparent that the constellations become better defined after MIMO processing.

Experimentation was performed in a laboratory setting with no atmospheric turbulence effects. As described above, the system 400 may be scaled to a larger number of transmit/receive device pairs and OAM channels over a relatively long distance with relatively careful system design. In general, the number of aperture pairs N and the number of OAM beams M in each transmit/receive device that can be accommodated may be limited by various factors, including system spatial dimensions, aperture sizes and channel conditions. Given a fixed transmitter and receiver aperture size, a larger OAM value results in a larger beam size at the receiver such that the recovered power decreases. Additionally, atmospheric turbulence should be considered for long-distance scenarios, in which turbulence effects might limit system performance. In this case, turbulence mitigation approaches, such as adaptive optics compensation, might be required.

Figure 10:
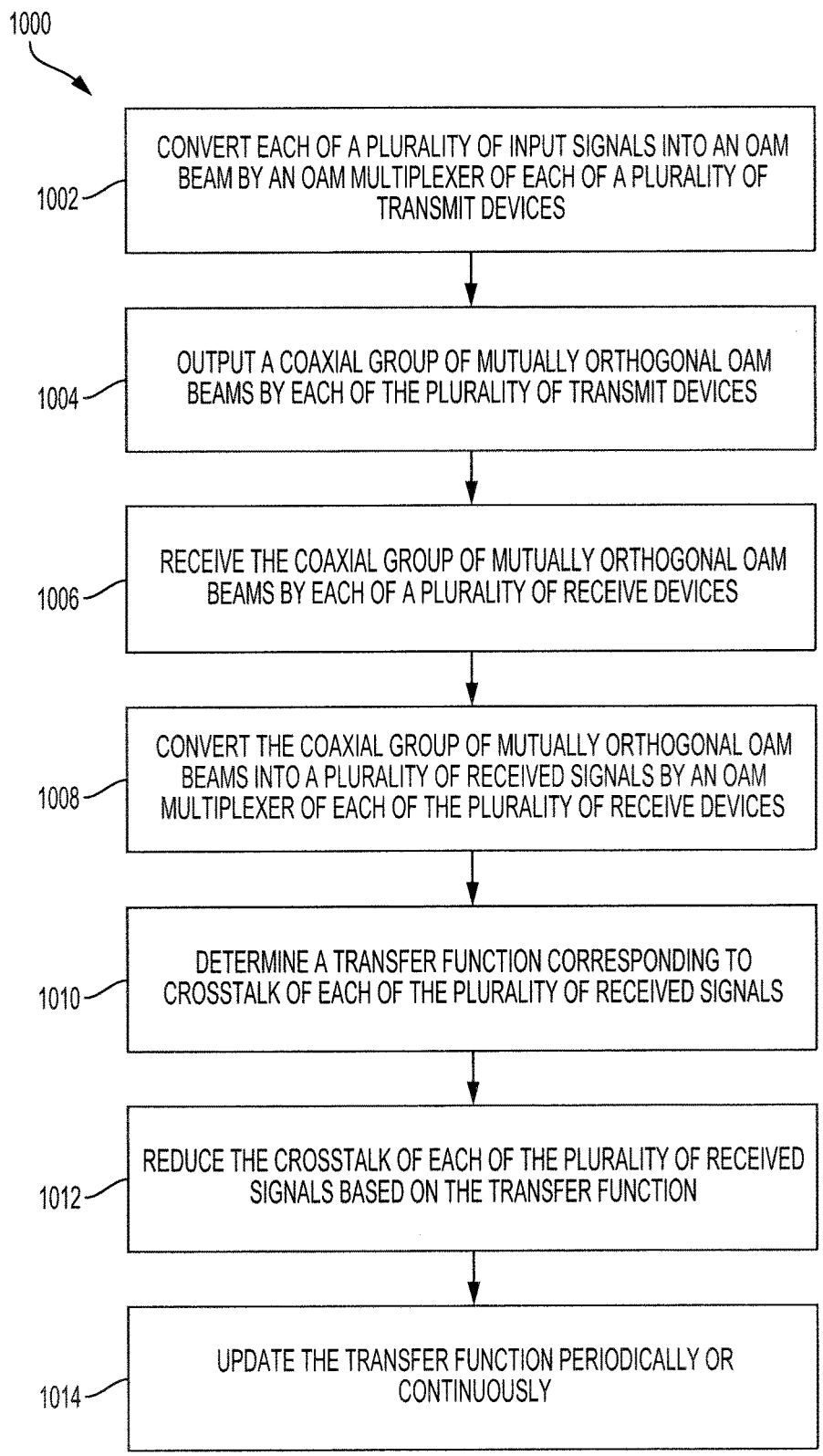
FIG. 10 is a flowchart illustrating a method for free space optical communications using multiple transmit devices each transmitting a group of coaxial and orthogonal OAM beams according to an embodiment of the present invention.

Turning to FIG. 10, a method 1000 for free space optical communications is shown. In block 1002, an OAM multiplexer of each of a plurality of transmit devices may convert a plurality of input signals into a corresponding OAM beam. In block 1004, each of the plurality of transmit devices may output a coaxial group of mutually orthogonal OAM beams that were formed in block 1002.

In block 1006, a plurality receive devices may each receive a coaxial group of mutually orthogonal OAM beams. Each of the plurality of receive devices may receive a group of OAM beams from a corresponding transmit device.

In block 1008, an OAM multiplexer of each of the receive devices may convert the corresponding group of OAM beams into a plurality of received signals. The received signals may correspond to a Gaussian beams and may each be output independently from each other.

In block 1010, a MIMO processor may determine a transfer function that corresponds to crosstalk between each of the plurality of received signals. In block 1012, the MIMO processor may reduce the crosstalk of each of the plurality of received signals based on the transfer function that was determined in block 1010. In block 1014, the MIMO processor may continuously or periodically update the transfer function.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A free-space optical communication system, comprising:
    a transmitter having a plurality of transmit devices each having a separate orbital-angular-momentum (OAM) multiplexer configured to convert each of a plurality of input signals into an OAM beam such that each of the plurality of transmit devices outputs a coaxial group of mutually orthogonal OAM beams, the plurality of transmit devices including a first transmit device that outputs a first coaxial group of mutually orthogonal OAM beams and a second transmit device that outputs a second coaxial group of mutually orthogonal OAM beams that overlaps the first coaxial group of mutually orthogonal OAM beams; and
    a receiver having:
        a plurality of receive devices each having a separate OAM demultiplexer configured to receive the coaxial group of mutually orthogonal OAM beams from a corresponding transmit device and to convert the coaxial group of mutually orthogonal OAM beams into a plurality of received signals corresponding to input signals represented by the coaxial group of mutually orthogonal OAM beams, a quantity of the plurality of receive devices being equal to a quantity of the plurality of transmit devices, each of the plurality of transmit devices outputting the coaxial group of mutually orthogonal OAM beams to a corresponding receive device of the plurality of receive devices, and
        a multiple-input-multiple-output (MIMO) processor coupled to the plurality of receive devices and having an equalizer configured to:
        determine a channel transfer matrix that represents a transfer function based on the overlap between the first coaxial group of mutually orthogonal OAM beams and the second coaxial group of mutually orthogonal OAM beams,
        determine crosstalk of each of the plurality of received signals using the channel transfer matrix representing the transfer function,
        reduce the crosstalk of each of the plurality of received signals based on the transfer function, and
        continuously or periodically update the transfer function.

2. The system of claim 1 wherein the separate OAM demultiplexer of each of the plurality of receive devices includes a first spatial light modulator configured to receive a first input signal corresponding to a first Gaussian beam and to convert the first input signal to a first OAM beam, and a second spatial light modulator configured to receive a second input signal corresponding to a second Gaussian beam and to convert the second input signal to a second OAM beam that is orthogonal to the first OAM beam.

3. The system of claim 1 wherein the channel transfer matrix is a diagonal matrix and based on overlaps between OAM beams at the receiver, which are related to a propagation distance and spacing between each transmit device of the plurality of transmit devices and between each receive device of the plurality of receive devices.

4. The system of claim 1 wherein the separate OAM demultiplexer of each of the plurality of receive devices further includes:
    a signal demultiplexer configured to receive the coaxial group of mutually orthogonal OAM beams and to output multiple copies of the coaxial group of mutually orthogonal OAM beams;
    a first spatial light modulator coupled to the signal demultiplexer and configured to receive a first copy of the coaxial group of mutually orthogonal OAM beams and to convert a first OAM beam from the coaxial group of mutually orthogonal OAM beams into a first received signal corresponding to a first Gaussian beam; and
    a second spatial light modulator coupled to the signal demultiplexer and configured to receive a second copy of the coaxial group of mutually orthogonal OAM beams and to convert a second OAM beam from the coaxial group of mutually orthogonal OAM beams into a second received signal corresponding to a second Gaussian beam.

5. The system of claim 1 wherein the receiver further includes at least one local oscillator configured to output a periodic signal with a predetermined frequency, and a plurality of optical couplers each coupled to the at least one local oscillator and configured to receive one of the plurality of received signals and to combine the periodic signal from the at least one local oscillator with the one of the plurality of received signals to reduce a frequency of each of the plurality of received signals by the predetermined frequency.

6. The system of claim 5 wherein the receiver further includes a plurality of photodiodes each coupled to one of the plurality of optical couplers and configured to detect an output signal from a corresponding optical coupler, and a plurality of analog to digital converters each coupled to one of the plurality of photodiodes and to the MIMO processor and configured to convert the detected output signal to a digital output signal.

7. The system of claim 1 wherein the transfer function is represented by the channel transfer matrix having dimensions of (N·M)×(N·M) where N represents to a quantity of the plurality of transmit devices of the transmitter and M represents a quantity of OAM beams within each coaxial group of mutually orthogonal OAM beams, and each element in the channel transfer matrix corresponds to a finite-impulse-response filter.

8. The system of claim 7 wherein an output of the equalizer for each of the plurality of received signals is represented by a first equation $$y_j = \sum_{i=1}^{4} \vec{w}_{ij} * \vec{x}_i$$

where $y_j$ represents the output of the equalizer, $\vec{w}_{ij}$ represents a coefficient vector of a corresponding finite-impulse-response filter and corresponds to the crosstalk, $\vec{x}_i$ represents a signal vector of a corresponding received signal, and $*$ represents a convolution operation.

9. The system of claim 8 wherein the MIMO processor is further configured to continuously or periodically update the transfer function using a second equation $\vec{w}_{ij}(k+1) = \vec{w}_{ij}(k) + \text{stepsize} \cdot e_i \cdot y_i \cdot \vec{x}^*_i$ where $\vec{w}_{ij}(k+1)$ represents an updated value of the coefficient vector of the corresponding finite-impulse-response filter, $\vec{w}_{ij}(k)$ represents a current value of the coefficient vector of the corresponding finite-impulse-response filter, stepsize represents a constant value, and $e_i$ represents a bit error after equalization.

10. A method for free-space optical communication comprising:
converting, by a separate orbital-angular-momentum (OAM) multiplexer of each of a plurality of transmit devices, each of a plurality of input signals into an OAM beam;
outputting, by each of the plurality of transmit devices, a coaxial group of mutually orthogonal OAM beams to a corresponding receive device of a plurality of receive devices, at least one coaxial group of mutually orthogonal OAM beams overlapping another coaxial group of mutually orthogonal OAM beams;
receiving, by a separate OAM demultiplexer of each of the plurality of receive devices, the coaxial group of mutually orthogonal OAM beams from a corresponding transmit device, a quantity of the plurality of receive devices being equal to a quantity of the plurality of transmit devices;
converting, by the separate OAM demultiplexer of each of the plurality of receive devices, the coaxial group of mutually orthogonal OAM beams from the corresponding transmit device into a plurality of received signals corresponding to input signals represented by the coaxial group of mutually orthogonal OAM beams;
determining, by an equalizer of a multiple-input-multiple-output (MIMO) processor, a channel transfer matrix representing a transfer function corresponding to crosstalk of each of the plurality of received signals based on the overlap of the at least one coaxial group of mutually orthogonal OAM beams with the other coaxial group of mutually orthogonal OAM beams;
reducing, by the equalizer of the MIMO processor, the crosstalk of each of the plurality of received signals based on the channel transfer matrix representing the transfer function; and
periodically or continuously updating, by the equalizer of the MIMO processor, the transfer function.

11. The method of claim 10 wherein converting each of the plurality of input signals into the OAM beam for each of the plurality of transmit devices includes:
receiving, by a first spatial light modulator, a first input signal corresponding to a first Gaussian beam;
converting, by the first spatial light modulator, the first input signal to a first OAM beam;
receiving, by a second spatial light modulator, a second input signal corresponding to a second Gaussian beam; and
converting, by the first spatial light modulator, the second input signal to a second OAM beam.

12. The method of claim 10 further comprising multiplexing, by a signal multiplexer, each OAM beam of each of the plurality of transmit devices into the coaxial group of mutually orthogonal OAM beams.

13. The method of claim 10 further comprising:
copying, by a signal demultiplexer of each of the plurality of receive devices, the coaxial group of mutually orthogonal OAM beams into multiple copies;
converting, by a first spatial light modulator, a first OAM beam of the coaxial group of mutually orthogonal OAM beams into a first received signal corresponding to a first Gaussian beam; and
converting, by a second spatial light modulator, a second OAM beam of the coaxial group of mutually orthogonal OAM beams into a second received signal corresponding to a second Gaussian beam.

14. The method of claim 10 further comprising:
outputting, by at least one local oscillator, a periodic signal having a predetermined frequency; and
combining, by each of a plurality of optical couplers, the periodic signal with one of the plurality of received signals to reduce a frequency of each of the plurality of received signals by the predetermined frequency.

15. The method of claim 14 further comprising:
detecting, by each of a plurality of photodiodes, an output signal from a corresponding optical coupler; and
converting, by each of a plurality of analog to digital converts, the detected output signal to a digital output signal.

16. The method of claim 10 wherein the transfer function is represented by the channel transfer matrix having dimensions of (N·M)×(N·M) where N represents to a quantity of the plurality of transmit devices and M represents a quantity of OAM beams within each coaxial group of mutually orthogonal OAM beams, and each element in the channel transfer matrix corresponds to a finite-impulse-response filter.

17. The method of claim 16 wherein an output of the equalizer for each of the plurality of received signals is represented by a first equation $$y_j = \sum_{i=1}^{4} \vec{w}_{ij} * \vec{x}_i$$

where $y_j$ represents the output of the equalizer, $\vec{w}_{ij}$ represents a coefficient vector of a corresponding finite-impulse-response filter and corresponds to the crosstalk, $\vec{x}$ represents a signal vector of a corresponding received signal, and * represents a convolution operation.

18. The method of claim 17 wherein periodically or continuously updating the transfer function is performed using a second equation $\vec{w}_{ij}(k+1) = \vec{w}_{ij}(k) + \text{stepsize} \cdot e_i \cdot y_i \cdot \vec{x}^*_i$ where $\vec{w}_{ij}(k+1)$ represents an updated value of the coefficient vector of the corresponding finite-impulse-response filter, $\vec{w}_{ij}(k)$ represents a current value of the coefficient vector of the corresponding finite-impulse-response filter, stepsize represents a constant value, and $e_i$ represents a bit error after equalization.

19. A free-space optical communication system, comprising:
a transmitter having a plurality of transmit devices each having a separate orbital-angular-momentum (OAM) multiplexer including at least one spatial light modulator and configured to convert each of a plurality of input signals into an OAM beam such that each of the plurality of transmit devices outputs a coaxial group of mutually orthogonal OAM beams, the plurality of transmit devices including a first transmit device that outputs a first coaxial group of mutually orthogonal OAM beams and a second transmit device that outputs a second coaxial group of mutually orthogonal OAM beams, the first coaxial group of mutually orthogonal OAM beams overlapping the second coaxial group of mutually orthogonal OAM beams; and
a receiver having:
a plurality of receive devices each having a separate OAM demultiplexer including at least one spatial light modulator and configured to receive the coaxial group of mutually orthogonal OAM beams from a corresponding transmit device and to convert the coaxial group of mutually orthogonal OAM beams into a plurality of received signals corresponding to input signals represented by the coaxial group of mutually orthogonal OAM beams, a quantity of the plurality of receive devices being equal to a quantity of the plurality of transmit devices, each of the plurality of transmit devices outputting the coaxial group of mutually orthogonal OAM beams to a corresponding receive device of the plurality of receive devices, and
a multiple-input-multiple-output (MIMO) processor coupled to the plurality of receive devices and having an equalizer configured to:
determine a channel transfer matrix that represents a transfer function based on the overlap between the first coaxial group of mutually orthogonal OAM beams and the second coaxial group of mutually orthogonal OAM beams,
determine crosstalk of each of the plurality of received signals using the channel transfer matrix representing the transfer function,
reduce the crosstalk of each of the plurality of received signals based on the transfer function, and
continuously or periodically update the transfer function, the transfer function being represented by the channel transfer matrix having dimensions of (N·M)×(N·M) where N represents a quantity of the plurality of transmit devices of the transmitter and M represents a quantity of OAM beams within each coaxial group of mutually orthogonal OAM beam, each element in the channel transfer matrix corresponding to a finite-impulse-response filter.

20. The system of claim 19 wherein:
an output of the equalizer for each of the plurality of received signals is represented by a first equation $$y_j = \sum_{i=1}^{4} \vec{w}_{ij} * \vec{x}_i$$

where $y_j$ represents the output of the equalizer, $\vec{w}_{ij}$ represents a coefficient vector of a corresponding finite-impulse-response filter and corresponds to the crosstalk, $\vec{x}_i$ represents a signal vector of a corresponding received signal, and * represents a convolution operation; and
the MIMO processor is further configured to continuously or periodically update the transfer function using a second equation $\vec{w}_{ij}(k+1) = \vec{w}_{ij}(k) + \text{stepsize} \cdot e_i \cdot y_i \cdot \vec{x}^*_i$ where $\vec{w}_{ij}(k+1)$ represents an updated value of the coefficient vector of the corresponding finite-impulse-response filter, $\vec{w}_{ij}(k)$ represents a current value of the coefficient vector of the corresponding finite-impulse-response filter, stepsize represents a constant value, and $e_i$ represents a bit error after equalization.

* * * * *